United States Patent [19]

Dawley

[11] 4,080,956
[45] Mar. 28, 1978

[54] SOLAR HEAT ABSORBER

[76] Inventor: Richard W. Dawley, 2164 Bonnie Dr., West Palm Beach, Fla. 33406

[21] Appl. No.: 582,886

[22] Filed: Jun. 2, 1975

[51] Int. Cl.² .............................................. F24J 3/02
[52] U.S. Cl. .................................................. 126/271
[58] Field of Search ................. 126/270, 271; 165/49, 165/171, 123

[56] References Cited

U.S. PATENT DOCUMENTS

| | | | |
|---|---|---|---|
| 2,202,756 | 5/1940 | Cline | 126/271 |
| 2,489,751 | 11/1949 | Candler, Jr. | 126/271 |
| 2,969,637 | 1/1961 | Rowekamp | 126/271 |
| 3,039,453 | 6/1962 | Andrassy | 126/271 |
| 3,152,260 | 10/1964 | Cummings | 126/271 |
| 3,194,228 | 7/1965 | Barques | 126/271 |
| 3,464,402 | 9/1969 | Colluva | 126/271 |
| 3,496,994 | 2/1970 | Cousins | 165/123 |
| 3,898,979 | 8/1975 | Medico, Jr. | 126/271 |

FOREIGN PATENT DOCUMENTS

| | | | |
|---|---|---|---|
| 892,332 | 1/1944 | France | 126/271 |
| 1,301,853 | 1/1973 | United Kingdom | 126/271 |

Primary Examiner—Lloyd L. King
Attorney, Agent, or Firm—Clarence A. O'Brien; Harvey B. Jacobson

[57] ABSTRACT

An insulated, watertight housing having a transparent panel forming a closure for the upper end and an absorption plate disposed inwardly of the transparent panel and provided with piping secured to the bottom surface thereof with the plate and piping being arcuately curved with the convex surface disposed upwardly and provided with a black coating on the upper surface thereof. In one embodiment, the piping is connected with an insulated storage tank for water circulation. In another embodiment, the piping serves as guide means and heat exchange means with air passing under the plate with this embodiment also including curved members which form a venturi secured to the underside of the plate to render the heat exchange between the plate and circulating air more efficient.

5 Claims, 5 Drawing Figures

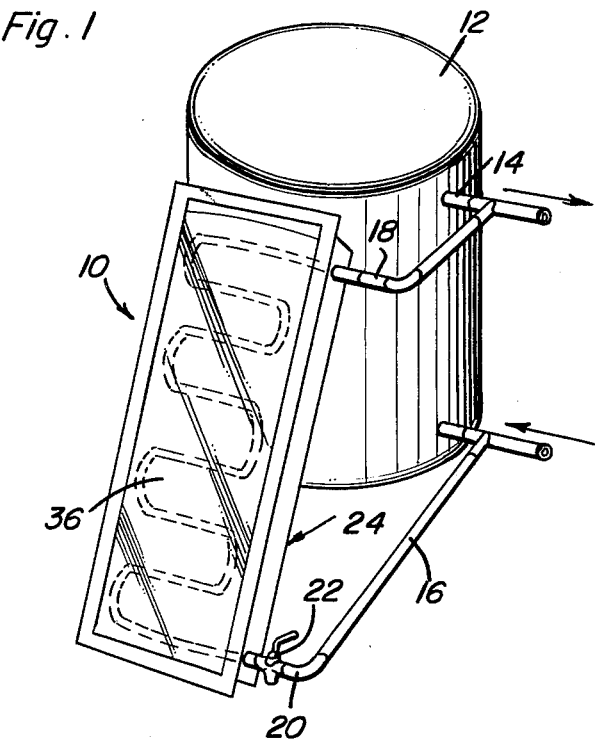
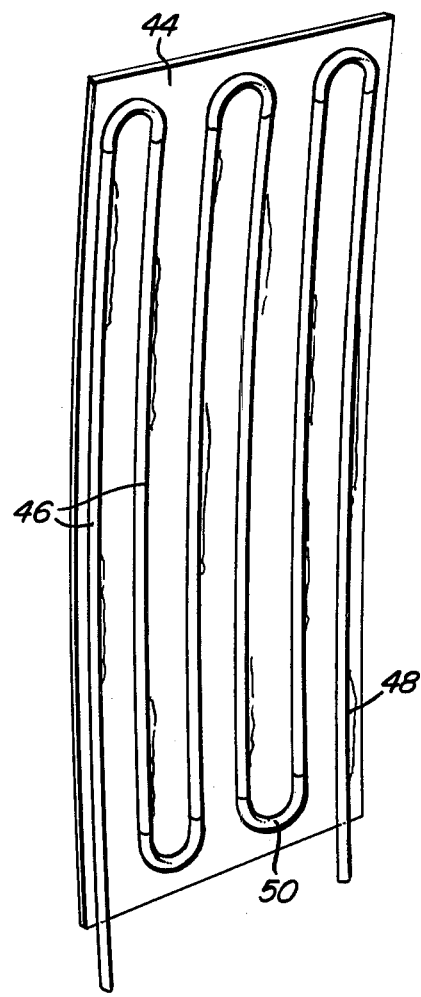
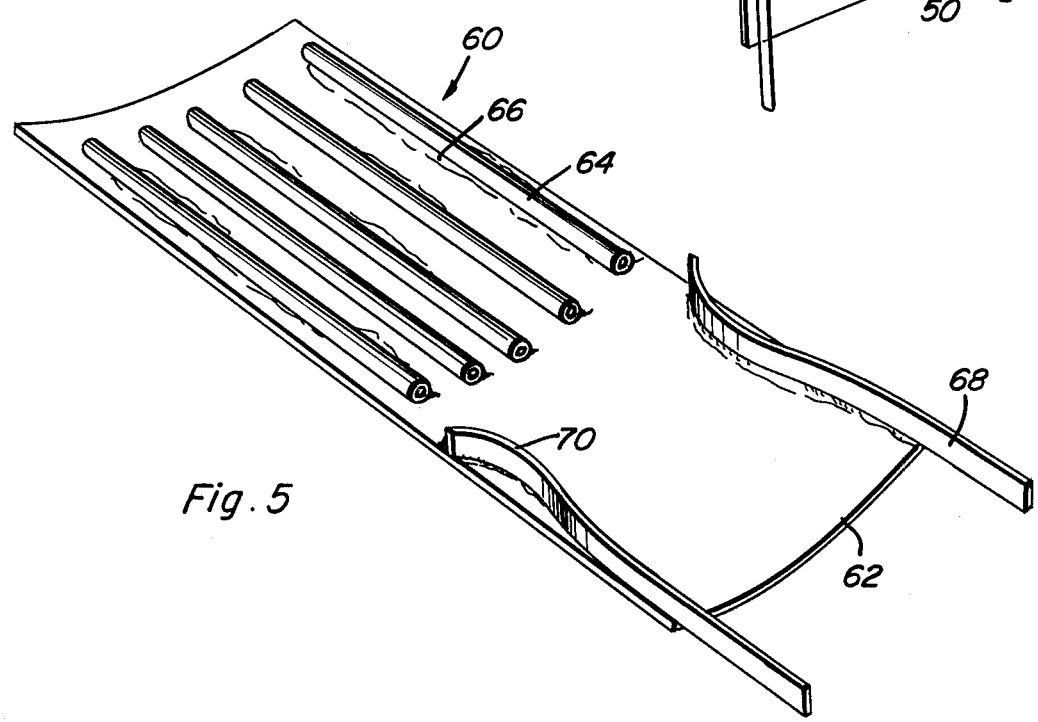

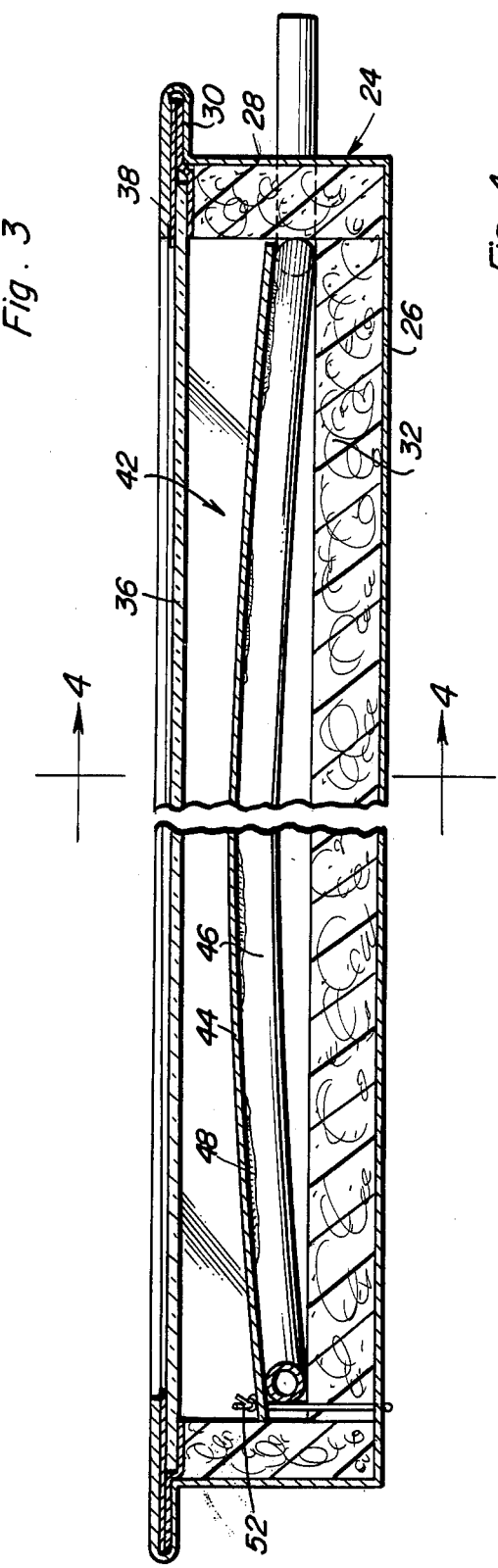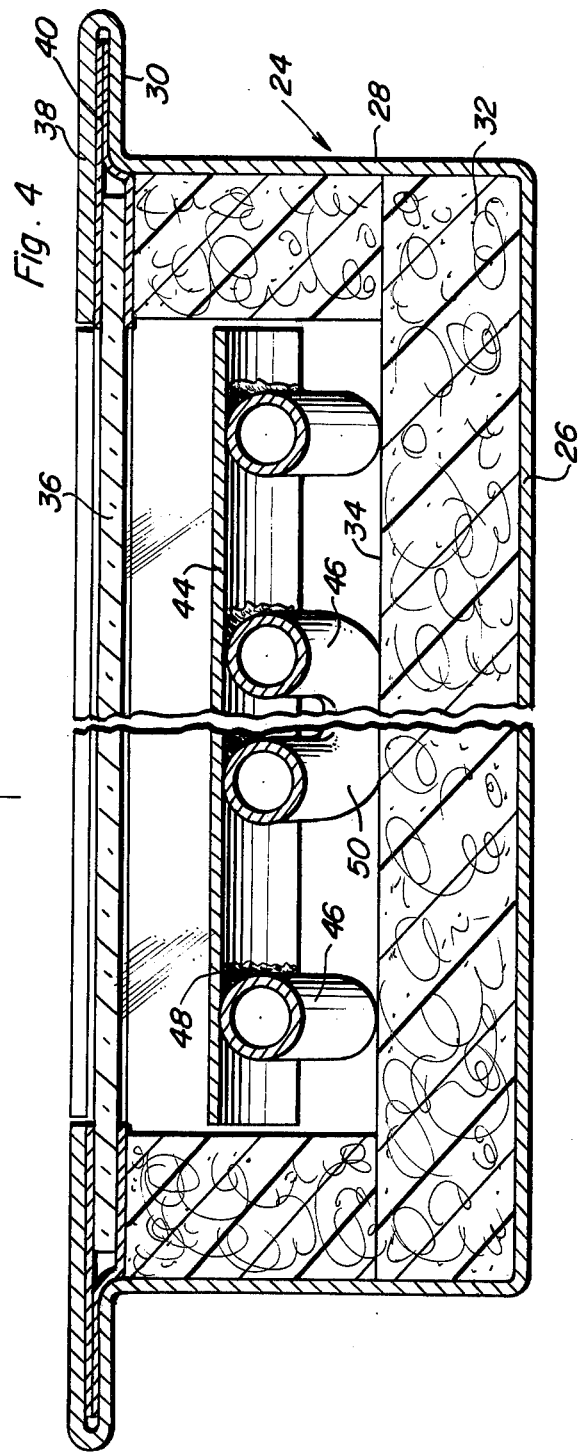

SOLAR HEAT ABSORBER

BACKGROUND OF THE INVENTION

1. Field of the Invention

The present invention generally relates to a solar heat absorbing device and more particularly such a device in which the fluid which is heated by solar heat passes below a uniquely constructed absorber plate which is convexly curved and coated in a manner for efficient transfer of solar heat to either liquid or air as a heat exchange medium.

2. Description of the Prior Art

Many prior efforts have been made to utilize solar energy for heating and other useful purposes but such devices generally have been restricted in their scope of use apparently because of the relative inefficient transfer of solar heat to a heat exchange medium. Such previously known devices employ some type of frame or container covered by a transparent panel with serpentine tubes disposed below the transparent panel for absorbing heat from the solar energy passing through the transparent panel and coming into contact with the tubes. The following U.S. Pat. Nos. represent previously known developments in this field:

1,093,925 - Apr. 21, 1914
1,338,644 - Apr. 27, 1920
1,753,227 - Apr. 8, 1930
2,311,579 - Feb. 16, 1943
2,705,948 - Apr. 12, 1955
3,039,453 - June 19, 1962
3,194,228 - July 13, 1965
3,262,493 - June 26, 1966
3,390,672 - June 2, 1968
3,815,574 - July 16, 1974

SUMMARY OF THE INVENTION

An object of the present invention is to provide a solar heat absorber capable of heating a liquid heat exchange medium, such as water, or a gaseous heat exchange medium, such as air, in an efficient manner by utilizing a curved absorber plate having heat exchange means mounted on the undersurface thereof with the upper surface of the plate being coated and provided with a transparent cover panel forming a closure for the open upper end of an enclosing insulated housing.

Another object of the invention is to provide a solar heat absorber in which the heat exchange means is in the form of a serpentine tubing soldered to the undersurface of the plate in a manner to be drained by gravity.

A further object of the invention is to provide a solar heat absorber in which the heat exchange means includes separate tubular pipes attached to the undersurface of the plate and venturi forming means at the inlet portion of the plate for guiding cold air past the pipes.

Still another object of the invention is to provide a solar heat absorber capable of efficient transfer of solar heat to water or air so that the water or air will be circulated by convection, thus eliminating the necessity of circulating pumps or fans with one practical embodiment of the invention being capabe of raising water to a temperature of 220° F and having the capacity of raising the temperature of one gallon of water 6° F per minute. In the hot air type of solar absorber, air may be heated to a temperature of 110° F at the rate of 6 cfm.

Still another important object of the present invention is to provide a solar heat absorber which is relatively simple in construction, easy to install, efficient in absorbing solar heat and transferring it to a liquid or gaseous heat exchange medium and relatively inexpensive to operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a diagrammatic perspective view illustrating the manner of association of the solar heat absorber combined with a water storage tank.

FIG. 2 is a perspective view of the solar absorber plate and the tubing on the undersurface thereof which is used with the tubing oriented horizontally.

FIG. 3 is a longitudinal, sectional view of the solar heat absorber illustrating the curved construction of the absorber plate and tubing secured to the undersurface thereof.

FIG. 4 is a transverse, sectional view taken substantially upon a plane passing along section line 4—4 of FIG. 3 illustrating further structural details of the solar heat absorber.

FIG. 5 is a fragmental perspective view of the absorber plate employed to heat air passing along the undersurface of the plate.

DESCRIPTION OF THE PREFERRED EMBODIMENTS

Referring now specifically to FIGS. 1-4 of the drawings, the solar heat absorber is generally designated by reference numeral 10 and is schematically illustrated in FIG. 1 in association with a storage tank 12 which may be insulated in any suitable manner with piping 14 interconnecting the upper end of the absorber and the storage tank and piping 16 interconnecting the lower end of the absorber and storage tank with this piping also including a supply and return line to a house heating system, with the supply line extending from the piping 14 and the return line connected with the piping 16 in a manner illustrated in FIG. 1. The piping 14 is provided with a check valve 18 permitting inflow into the upper end of the absorber and the piping 16 includes a check valve 20 and a drain valve 22 therein which enables flow from the absorber 10 to the storage tank 12 but prevents reverse flow with the drain valve 22 enabling the entire absorber panel to be drained when necessary. The absorber 10 will be oriented in vertical inclined relation as illustrated in FIG. 1 or horizontally inclined relation, or any other suitable relation, so that it is exposed to the sum for a maximum period of time. Additionally, multiple solar heat absorbers 10 may be connected in series or parallel to a single storage tank and other installation variations may be used depending upon the requirements of each installation.

The absorber 10 includes a metal watertight container or housing 24 including a bottom panel 26 and upstanding side walls 28 all of which are constructed of sheet material, such as sheet metal, having an outwardly extending flange 30 at the upper edge thereof. The interior of the container 24 is lined with an insulating material 32 having a metallic foil liner 34 on the inner surface thereof. The open upper end of the container 24 is provided with a transparent closure member or panel 36 of glass, plastic, or the like, with the periphery of the panel 36 resting against the upper surface of the insulation 32 along the side walls 28 and the edge of the flange 30 is folded over into an upper flange 38 having its inner periphery generally in alignment with the inner periphery of the insulation 32 which is disposed against the inner surface of the side walls 24. A sealing tape 40 underlies the peripheral edge of the glass panel 36 and extends outwardly into overlying engagement with the flange 30 with a second piece of tape 40 overlying the periphery of the glass panel 36 and underlying the outer portion of the flange 38 with the tape being conventional duct tape and adhesively secured to the associated components for providing a weatherproof and waterproof seal for the interior of the container 24.

Disposed interiorly of the container 24 is an absorber plate generally designated by numeral 42 and which includes an elongated, generally rectangular panel 44 of metal sheet material having a serpentine tube 46 secured to the undersurface thereof by soldering 48 along only one side of the tubing and the undersurface of the panel 44. The outer ends of the tubing 46 are interconnected by generally U-shaped connector portions 50 with the tubing being arranged so that all of the tubing may be drained by opening the drain valve for gravity discharge of the material in the tubing so that the water or other liquid in the tubing may be removed when desired.

As illustrated in FIG. 3, the absorber plate panel 44 convexly curved with the crown being in the middle with the convex shape having any desired curvature. In one embodiment, the crown may be from 1 to 1¼ inches to several inches above the ends. As illustrated in FIGS. 1 and 2, the panel 44 is provided with the center of convex portion generally coinciding with the center of the piping when vertically oriented as in FIG. 1 and in the panel 44 used horizontally which is constructed in the manner shown in FIG. 2 and installed in the manner of FIGS. 3 and 4. The upper surface of the panel 44 is coated but is first prepared for the coating or paint by removing the shine with coarse steel wool. A flat black paint, such as acrylic base exterior masonry paint, is applied, preferbly in two coats, one horizontally and one vertically and is inserted into the container and anchored therein in any suitable manner, such as twist wire loop anchors 52 which secure the absorber plate 42 against the upper surface of the insulation 32 overlying the bottom wall 26 of the container.

FIG. 5 illustrates an embodiment of the invention in which the absorber plate is used with air as a heat exchange medium and is generally designated by numeral 60 and includes an elongated absorber panel 62 having a plurality of parallel, spaced tubes 64 on the bottom surface thereof which are soldered throughout the length thereof, as indicated at 66, but with the tubes being shorter than the panel or plate 62. The panel 62 is the same in construction as the panel 44, as illustrated in FIGS. 2–4, with the tubes 64 being spaced and parallel to each other. A pair of support bars or arms 68 are rigidly secured to the undersurface of the panel 62 and extend inwardly thereof and include inwardly curved portions 70 which define a venturi for incoming cold air. The absorber plate 60 would be disposed within a container, similar to container 24, with the cold air inlet communicating with one end thereof and any suitable outlet duct or ducts associated therewith in which the arms 68 further supports the panel 62.

While dimensional characteristics may vary, it has been found that a solar heat absorber 10 constructed with the container being of 30 gauge galvanized steel having an interior length of 46 inches and a depth of 3 inches and an interior width of 14 inches will properly receive an absorber plate which is 12 inches wide and 44 inches long and constructed of 16 gauge galvanized steel. The piping 46 is in the form of ¾ inch copper piping in which the soldering does not extend closer than 1 to 2 inches from the end fittings and including two pieces of 48 inch length which extend beyond and through the end wall of the container and four 41 inch pieces and five return bends 50 as illustrated in FIG. 2. After the pipes and ends have been assembled and soldered properly along one side only of each of the tubes, the panel is bent so the upper surface is convex with the crown being 1 inch to 1¼ inch above the ends, so that when the panel is assembled into the container, the center top surface of the panel 44 will be approximately 1 inch to 1⅛ inch from the bottom of the glass panel. Such an arrangement will, on a sunny day, effectively raise the temperature of one gallon of water 6° F per minute, develop sufficient head pressure to convect water through the system without circulating pumps and produce a maximum temperature of 220° F.

In the hot air embodiment of the invention with the panel 66 being 12 inches wide and 44 inches long and the tubes 64 being 28 inches long and ¾ inch in diameter, the arms 66 being 8 inches long and curved inwardly 1 inch from each side edge of the plate to form a venturi, incoming air at 80° F will be heated to a temperature of 104° at approximately 6 cfm with a temperature of 110° F being attainable at a slightly reduced rate of flow.

The tubes, in both embodiments, being in direct contact with the undersurface of the panel will receive heat therefrom by conduction as well as radiation and the arc provided in the panel not only provides optimum incidence of the sun rays impinging upon the panel but also retains heat under the crown portion thereof at a relatively high temperature. The non-reflective charcoal or black coating on the upper surface thereof further increases the effectiveness of heat absorption of the panels. The relatively high temperature obtained by the two embodiments of the invention enables the hot water or hot air to be utilized in various installations either by direct heat exchange relationships or indirect heat exchange relationships.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar heat absorber comprising an insulated housing having a transparent member exposed to solar heat, and an absorber plate mounted in said housing below the transparent member, said absorber plate comprising a heat conductive panel having a substantially smooth and uninterrupted surface facing the transparent member, conduit means disposed completely below the panel and adapted to be communicated with heat exchange fluid inlet and outlet means, and means securing said conduit means to the undersurface of said panel, said panel being arcuately curved with the convex surface disposed adjacent to but in spaced relation to the transparent member, the periphery of the panel being adjacent the internal insulation forming the insulated housing to provide a dome-like cavity in underlying relation to the panel for enabling the solar heat to elevate the temperature of the heat conductive panel, said conduit means being constructed of heat conductive material for efficient transfer of heat to the heat exchange fluid.

2. The structure as defined in claim 1 wherein said heat conductive panel is of sheet metal, said conduit means being in the form of a metal tube of serpentine configuration disposed against the undersurface of said panel, said means securing the conduit means to the panel including a hardenable material positioned solely along one side of the tube for joining the tube to the panel in heat exchange, contacting relation.

3. The structure as defined in claim 1 wherein said conduit means includes a plurality of substantially parallel, open ended tubes secured to the undersurface of said panel for reception of heat exchange air passing therethrough and therebetween, said tubes being shorter than the panel, and a pair of longitudinally extending plates secured to the undersurface of said panel and including an inwardly curved area therebetween defining a venturi disposed in spaced but generally aligned relation to the tubes to increase air flow velocity along the undersurface of the panel and through the tubes.

4. The structure as defined in claim 1 wherein the peripheral edge of said panel is slightly spaced from the interior insulation to enable thermosiphon flow of air around the plate to more efficiently heat both surfaces of the plate and reduce condensation on the interior of the transparent member, said interior insulation having a reflective lining to enhance heat absorption by the panel and conduit means.

5. The structure as defined in claim 2 wherein said serpentine tube is constructed so that one convolution thereof is at a lower level than all of the other convolutions to enable drainage of liquid heat exchange fluid from the tubes.

* * * * *